(12) United States Patent
Martin et al.

(10) Patent No.: US 9,693,022 B2
(45) Date of Patent: Jun. 27, 2017

(54) SOLAR-POWERED CAMERA THAT MOUNTS DIRECTLY ON EXISTING LIGHTING

(71) Applicant: Pelco, Inc., Clovis, CA (US)

(72) Inventors: Steven D. Martin, Fort Collins, CO (US); Prateek Jain, Clovis, CA (US); Oscar R. Herrera, Windsor, CO (US); Eric Shumard, Clovis, CA (US); David Dorn, Clovis, CA (US); Susan Brooks-Evans, Clovis, CA (US)

(73) Assignee: PELCO, INC., Clovis, CA (US)

(*) Notice: Subject to any disclaimer, the term of this patent is extended or adjusted under 35 U.S.C. 154(b) by 432 days.

(21) Appl. No.: 13/829,428

(22) Filed: Mar. 14, 2013

(65) Prior Publication Data

US 2014/0267711 A1   Sep. 18, 2014

(51) Int. Cl.
*H04N 7/18* (2006.01)
*G08B 13/196* (2006.01)
*G08B 29/18* (2006.01)

(52) U.S. Cl.
CPC ....... *H04N 7/183* (2013.01); *G08B 13/19632* (2013.01); *G08B 29/181* (2013.01)

(58) Field of Classification Search
USPC ........................................................ 348/143
See application file for complete search history.

(56) References Cited

U.S. PATENT DOCUMENTS

| | | | | |
|---|---|---|---|---|
| 6,707,274 | B1* | 3/2004 | Karr | H01M 10/46 320/107 |
| 2006/0268979 | A1* | 11/2006 | Chang | 375/240.01 |
| 2008/0100707 | A1* | 5/2008 | Brown | 348/158 |
| 2009/0268438 | A1* | 10/2009 | Huang | 362/183 |
| 2012/0170258 | A1* | 7/2012 | VanDuinen et al. | 362/217.02 |
| 2012/0185325 | A1* | 7/2012 | Shani | 705/14.43 |
| 2013/0038786 | A1* | 2/2013 | Geller | G03B 15/03 348/371 |
| 2013/0221173 | A1* | 8/2013 | Glover | 248/206.5 |

* cited by examiner

*Primary Examiner* — Tracy Y Li
(74) *Attorney, Agent, or Firm* — Hamilton, Brook, Smith & Reynolds, P.C.

(57) ABSTRACT

Surveillance cameras can be used in many buildings accessible to the public to deter criminal activity and promote public safety. Apparatus and corresponding methods, of the disclosed embodiments of the invention promote installation and use of such surveillance devices through an improved camera mounting module and power supply unit using a solar module having solar cells. An example embodiment of the surveillance devices includes an imaging device, power supply unit employing a solar module having solar cells, and a mounting module coupled to the imaging device, the solar cells being configured with the mounting module to collect light and provide available power to the power supply unit. The disclosed surveillance device, and corresponding process of performing surveillance, minimizes installation and maintenance costs and times associated with surveillance systems.

31 Claims, 7 Drawing Sheets

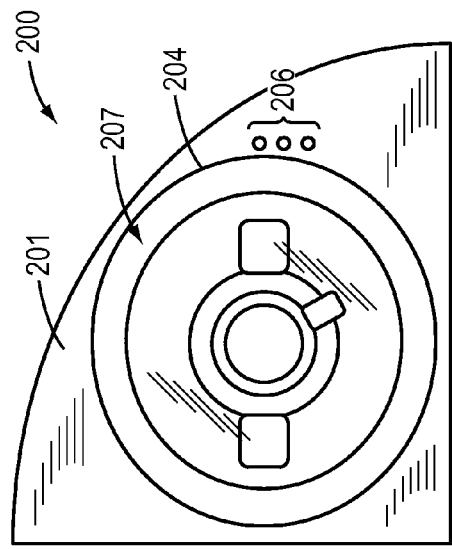
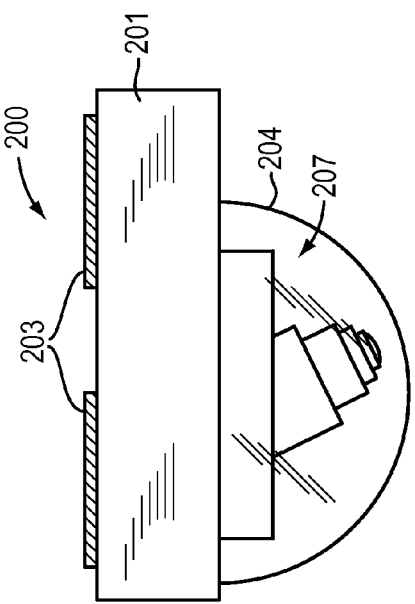
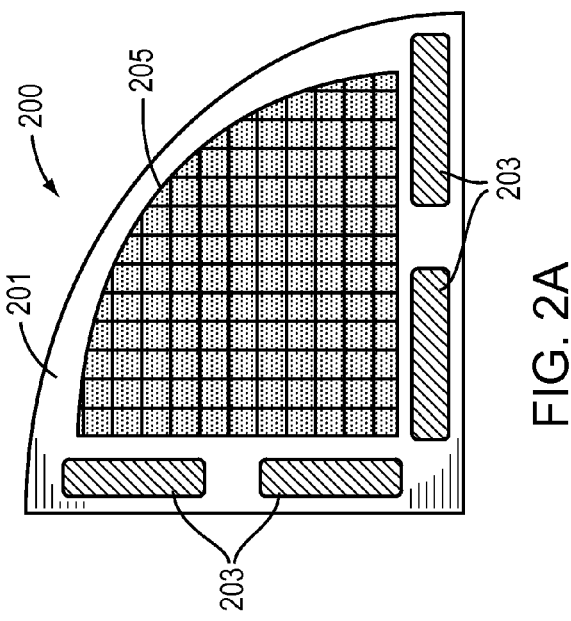

SOLAR-POWERED CAMERA THAT MOUNTS DIRECTLY ON EXISTING LIGHTING

BACKGROUND OF THE INVENTION

Surveillance is the monitoring of activities or other changing information, usually the behavior of people, for the purpose of influencing, managing, directing, or protecting. Government and law-enforcement agencies, as well as other authorities, often use surveillance to recognize and monitor threats, investigate criminal activity, and maintain social control. Surveillance devices, such as closed circuit or securely networked video cameras, are typically used by authorities to monitor a particular area. Often the installation of such surveillance devices serves as a deterrent for criminal behavior. Examples include the installation of video cameras to monitor busy public spaces, such as Times Square in New York, or inside or outside of retail shops.

Unrelated to the field of surveillance, solar power has been used to power a number of small and medium-sized applications. Examples include applications ranging from a calculator using a single solar cell to off-the-grid homes using an array of solar cells to supply power. Solar power is the conversion of light into electricity, typically converted directly using photovoltaics (PVs), which convert light into electricity using the photoelectric effect. Solar power is seen as an environmentally friendly and clean energy source. Now, many traffic lights and traffic cameras and even public trash receptacles take advantage of their outdoor location and access to sunlight by using solar power to operate.

SUMMARY OF THE INVENTION

In recent years, the capability, quality, and reliability of many electrical components has increased, while at the same time the corresponding size and cost has decreased. Surveillance devices, which include electrical components such as cameras, microphones, processors and communications devices, have had corresponding increases in capability, quality, and reliability and decreases in size and cost. Such a trend has led to an increased demand from consumers for surveillance devices.

However, the cost of installing and maintaining surveillance devices is still a major factor in the decision to install a surveillance system. Surveillance devices require a communications channel in order to report activity and power in order to operate, both of which are typically hard-wired. As a result, the installation of surveillance devices can be expensive in both new and retrofit construction.

Installing and operating a surveillance device using a wireless communications channel may appear to reduce the cost associated with installing surveillance devices. However, typically, power must still be supplied by installing a separate power conduit or multi-purpose (shared) conduit, such as Power over Ethernet (PoE). Because a physical conduit needs to be installed for the surveillance devices, costs still remain high.

A possible solution that reduces installation costs is to equip the surveillance devices with a battery or batteries. However, such batteries need to be replaced when they are no longer functional. Such replacement is not only inconvenient, requiring access to the installation site, but also increases maintenance costs.

Example embodiments and methods of the present invention are useful because conduit for network and power connections does not have to be installed in either new or retrofit construction in order to supply power and communications capabilities to the surveillance device. Furthermore, the surveillance device can be installed quickly and easily once, rather than requiring additional maintenance (e.g., one quick trip up the ladder). As such, example embodiments and methods of the present invention minimize installation and maintenance costs and offer an efficient and effective solution for many surveillance needs.

Example embodiments of the present invention include a surveillance device includes an imaging device or camera, power supply unit employing a solar module having solar cells to convert light to available power, and a mounting module coupled to the imaging device or camera. In some embodiments, the mounting module includes a mounting surface, and the solar cells of the solar module are configured with the mounting module to collect the light and provide the available power to the power supply unit.

Example embodiments of the present invention can further include a surveillance device wherein the solar cells of the solar module are arranged on the mounting surface to collect the light and provide available power to the power supply unit. The surveillance device can further include a base structure having a bottom side, the imaging device or camera being coupled to the bottom side, and the mounting module being coupled to the base structure and arranged to mount the surveillance device. The surveillance device can further include a housing unit integrating the base structure in the mounting module, and be coupled to the imaging device or camera and power supply unit.

The mounting module can further include a mounting element(s), including a mounting element(s), including a magnetic material, arranged on the mounting surface to enable the surveillance device to mount to a paramagnetic material in close proximity to a lighting source. The paramagnetic material can be a metal channel support of a drop ceiling, and the lighting source can be a drop ceiling lamp. The magnetic material can include one or more permanent magnets or ferromagnetic material. The one or more permanent magnets or ferromagnetic material can be arranged along at least one edge of the mounting surface. The power supply unit can further include a battery to store electrical energy based on the available power.

An example embodiment of the surveillance device can further include a microphone to enable audio surveillance, the microphone being powered directly or indirectly by the available power. The surveillance device can further include an audio speaker module with an audio speaker to enable verbal communication with a target of surveillance, the audio speaker module being powered directly or indirectly by the available power. The mounting elements of the mounting module can further include brackets coupled to the mounting surface to enable the surveillance device to couple to a metal channel of a drop ceiling in close proximity to a lighting source or to couple to a lighting source. The imaging device or camera can be an Internet Protocol (IP) camera being powered directly or indirectly by the available power.

Example embodiments of the surveillance device can further include a wireless communications module communicatively coupled to the imaging device or camera to receive a video feed and configured to transmit the video feed wirelessly, the wireless communications module being powered directly or indirectly by the available power. The surveillance device can also include a wired communications channel. The wireless communications module can include a radio frequency (RF) transceiver enabling broadcast transmissions and receptions of wireless RF signals. Thus, the surveillance device can operate with output and input/output functionality. The communications module can also include an optical transceiver, infrared (IR) transceiver, or any other wireless communications transceiver. The mounting elements of the mounting module can further include a hook-and-loop fastener module coupled to the mounting surface to enable the surveillance device to mount to a hook-and-loop fastener receptacle in close proximity to a lighting source.

Example embodiments of the present invention further include a method of surveying which may including capturing video using an imaging device or camera, converting light to available power using a power supply unit employing a solar module having solar cells, and enabling the mounting of the imaging device or camera using a mounting module including a mounting surface, the solar cells of the solar module being configured with the mounting module collect the light and provide the available power to the power supply unit.

Enabling the mounting can further include arranging the solar cells of the solar module on the mounting surface for collecting light and providing the available power to the power supply unit. The method can further include coupling the imaging device or camera and the mounting module to a base structure, the imaging device or camera being coupled to a bottom side of the base structure, and the mounting module arranging the base structure for mounting.

Example embodiments may further include integrating the mounting module and base structure to form a housing unit, and coupling the imaging device or camera and power supply unit to the base structure. The mounting can further include employing a magnetic material arranged on the mounting surface for mounting to a paramagnetic material in close proximity to a lighting source. The mounting to a paramagnetic material in close proximity to a lighting source can include mounting to a metal channel support of a drop ceiling in close proximity to a drop ceiling lamp. The mounting employing the magnetic material can further include employing one or more permanent magnets or ferromagnetic material. The employing of one or more permanent magnets or ferromagnetic material can further include arranging the one or more permanent magnets or ferromagnetic material along at least one edge of the mounting surface. The converting of light to available power can further include storing electrical energy converted by the solar module at a battery.

Example embodiments of the method of surveying can further include capturing audio using a microphone, enabling audio surveillance, and directly or indirectly powering the microphone using the available power. The method of surveying can further include enabling communications with a target of surveillance using an audio speaker module including an audio speaker, and directly or indirectly powering the audio speaker module using the available power. The mounting can further include employing brackets coupled to the mounting surface to enable the mounting of the surveillance device to a metal channel of a drop ceiling in close proximity to a lighting source. The capturing video can use an IP camera and directly or indirectly powering the IP camera using the available power.

Example embodiments of the method of surveying can further include receiving a video feed from the imaging device or camera at a wireless communications module, wirelessly transmitting the video feed, and directly or indirectly powering the wireless communications module using the available power. Wirelessly transmitting the video can include using radio frequency (RF), optical, infrared (IR), or any other type of wireless communications. The communications module can also be wired. The mounting can further include employing a hook-and-loop fastener module coupled to the mounting surface, thereby enabling the mounting of the surveillance device to a hook-and-loop fastener receptacle in close proximity to a lighting source.

Example embodiments may further include a means for capturing video, means for capturing light to available power, and means for mounting the surveillance device and providing available power for capturing video.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 2A-2G illustrate various views of example embodiments of the surveillance device.

DETAILED DESCRIPTION OF THE INVENTION

A description of example embodiments of the invention follows.

Currently, the costs associated with the installation and maintenance of surveillance systems have become a larger percentage of the overall cost of a surveillance system due to the fact that surveillance equipment, such as surveillance cameras have become less expensive. Typically, the installation of surveillance devices, such as cameras, includes the installation of wiring conduit to provide power and/or network connections, which is expensive. One potential way to reduce installation costs is to eliminate the need to install communications and power wiring by using wireless communications and batteries; however, maintenance costs and operating costs would be increased due to the fact that the batteries would need to be replaced following power discharge.

Figure 1:
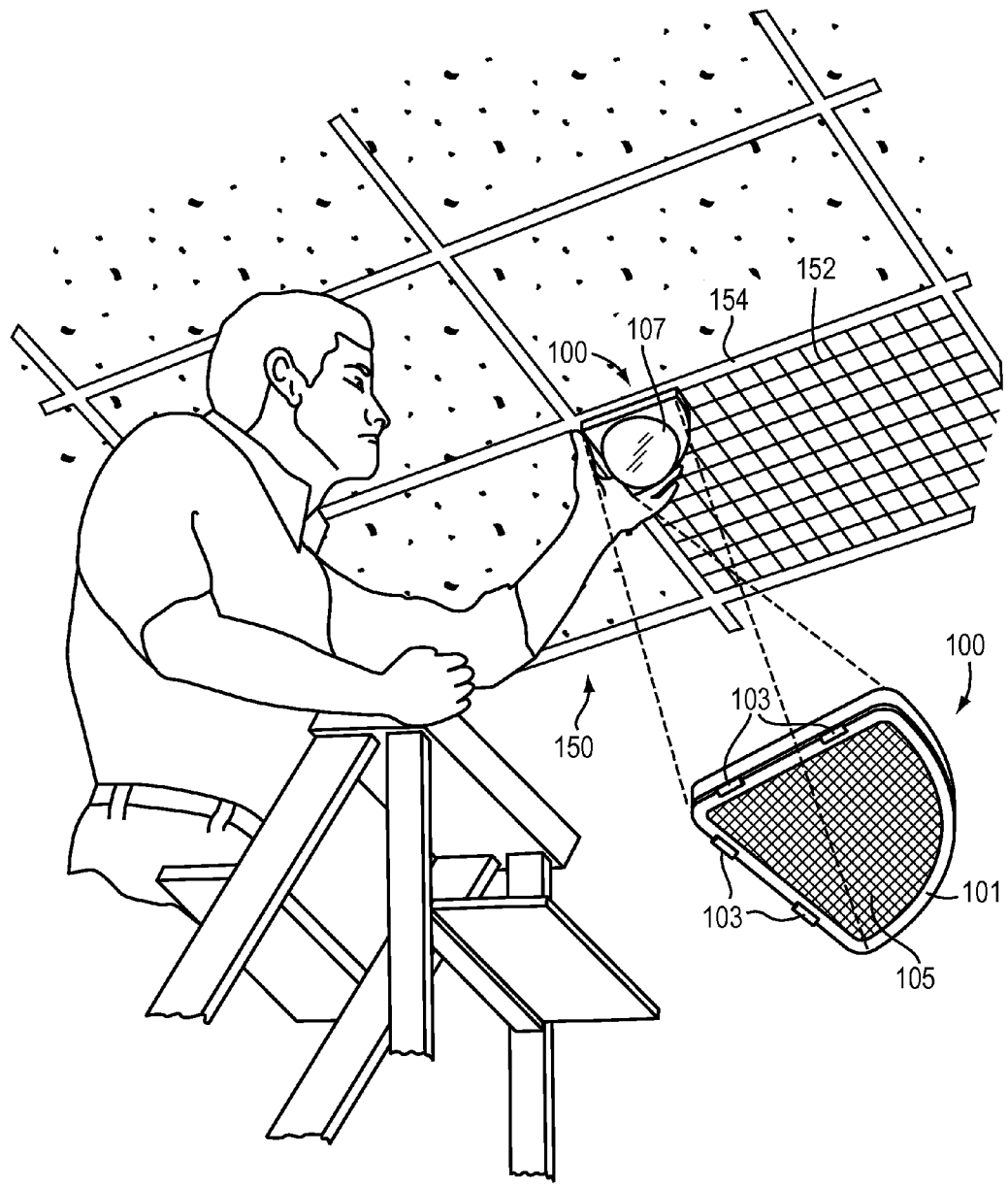
FIG. 1 illustrates an environment in which a surveillance device according to example embodiments of the present invention may be used.

FIG. 1 illustrates the installation of a surveillance device in an example environment in which the surveillance device can be used according to an example embodiment of the present invention. The surveillance device 100 includes a mounting module 101. The mounting module 101 can include mounting elements 103, such as magnets, and a solar module 105 that employs solar cells. The surveillance device 100 can be mounted to ceiling channel supports 154 of a typical drop ceiling 150 near a drop ceiling lamp 152.

The mounting of the surveillance device 100 equipped with the solar module 105 enables an imaging device, such as an imaging device or camera 107, which may be a low power device, to harvest energy by being mounted near and exposed to an existing light source. The solar module 105 having solar cells can be arranged on the mounting surface itself of the mounting module 101.

The surveillance device 100, which can be small with respect to the lighting source, such as the drop ceiling lamp 152, can be mounted such that only a very small amount of light is blocked by the surveillance device 100. Even though only a small amount of light is blocked by the surveillance device, the surveillance device, using the solar module 105, can convert sufficient light energy to available power due to its close proximity and exposure to the lighting source. Additionally, available power can be stored in a battery (not shown) physically disposed within or external from the surveillance device 100 and electrically coupled to the solar module 105.

Mounting of the surveillance device 100 can be done in many ways. For example, using standard drop ceiling lighting and existing drop ceiling hardware, a surveillance device can be magnetically attached to the metal channel supports 154 surrounding and supporting a drop ceiling lamp 152. The solar module 105 having solar cells can then be directly arranged on the surface of the mounting such that the drop ceiling lamp is directly overhead. In other words, the solar powered surveillance device can be mounted directly under a ceiling lamp.

FIGS. 2A-2C, 2D-2E, and 2F-2G illustrate first, second, and third example embodiments of the present invention, respectively.

FIGS. 2A-2C illustrate various views of an example embodiment of a surveillance device 200. FIG. 2A is a top view of the surveillance device 200 and includes a mounting module 201, mounting elements 203, and solar module 205 having solar cells. The mounting elements 203, such as permanent magnets, are arranged on the mounting surface of the mounting module 201. Further, the mounting elements 203 (magnets) are arranged along the straight two edges of the mounting surface of the mounting module 201. Also, the solar module 205 may be arranged on the mounting surface of mounting module 201, as shown in FIG. 2A.

Using an embodiment of FIG. 2A, where the mounting elements 203 are arranged along perpendicular edges of the mounting module 201, the surveillance device 200 can be mounted to the bottom of the perpendicular intersection metal channel supports 154 at the corner of drop ceiling lamp 152 (as shown in FIG. 1). Thus, the surveillance device 200 is positioned such that solar module 205 having solar cells is exposed to collect light from the drop ceiling lamp 152.

FIG. 2B illustrates a bottom view of the surveillance device 200. The surveillance device 200 includes the mounting module 201, imaging device or camera 207, and can optionally include a dome 204, as well as a physical user interface 206. The dome 204 can cover and protect the imaging device or camera 207 from the environment, as well as keep the direction of focus of the imaging device or camera 207 concealed. The physical user interface 206 may include "reset" and "NTSC/PAL" (i.e., video format) buttons, an analog output service port, microphone and/or audio speaker, or any combination thereof.

FIG. 2C is a side view of the surveillance device 200 and shows the mounting module 201 having the mounting elements 203 (magnets) arranged on the mounting surface of mounting module 201 such that the top surface of the mounting elements 203 (magnets) is raised or elevated above the mounting surface of mounting module 201. The imaging device or camera 207 is coupled to the mounting module 201. A dome 204 can optionally be coupled to the mounting module 201 in order to protect the camera from the environment, as well as offer additional deterrence in that a target of surveillance (e.g., person being watched) does not know where the camera is focused.

Figure 2D:
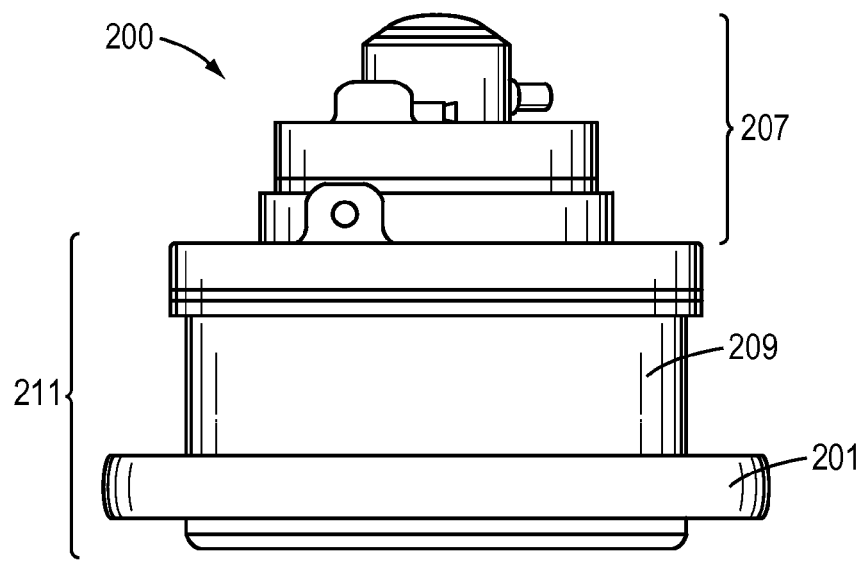

FIG. 2D illustrates a side view of a second example embodiment of a surveillance device 200, including the imaging device or camera 207, mounting module 201, base structure 209 (also referred to herein as a "back box"). The mounting module 201 and base support structure 209 can be integrated to form a housing structure 211, retaining the functionality of the individual pieces. The integrated unit may be referred to herein as the mounting module 201 or housing structure 211.

The first example embodiment of FIGS. 2A-2C illustrates an integrated example of the mounting module 201, base support structure 209 and housing structure 211, and is referred to herein as the mounting module 201. Those of skill in the art will recognize that other embodiments and arrangements, including the relative elevations of the mounting surface with respect to the solar module, are possible and are within the scope of the present disclosure.

Figure 2E:
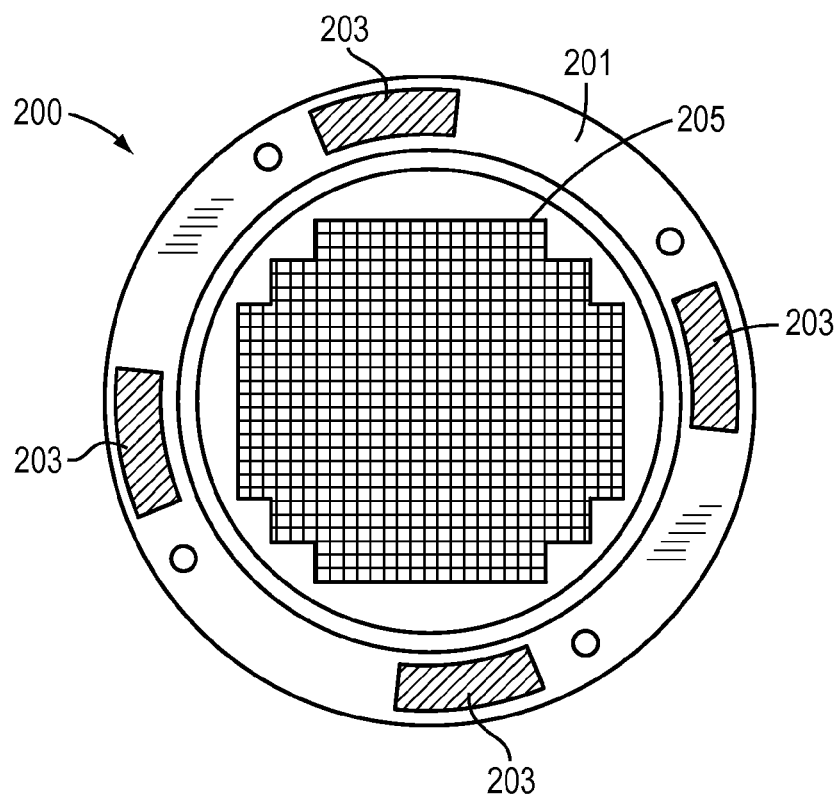

FIG. 2E shows a top view of the second example embodiment of the surveillance device 200. The surveillance device 200 of FIG. 2E includes the mounting elements 203, mounting module 201, and solar module 205 including solar cells for converting light to available power. The mounting elements 203 can be permanent magnets arranged on the mounting surface of the mounting module 201. The solar module 205 is arranged on the surface of the base structure 209 such that the solar module 205 is elevated relative to the mounting module 201 in the mounted position and the solar module is exposed directly to a light source. The top surfaces of the solar module 205 and mounting module 201 may or may not be coplanar.

Figure 2F:
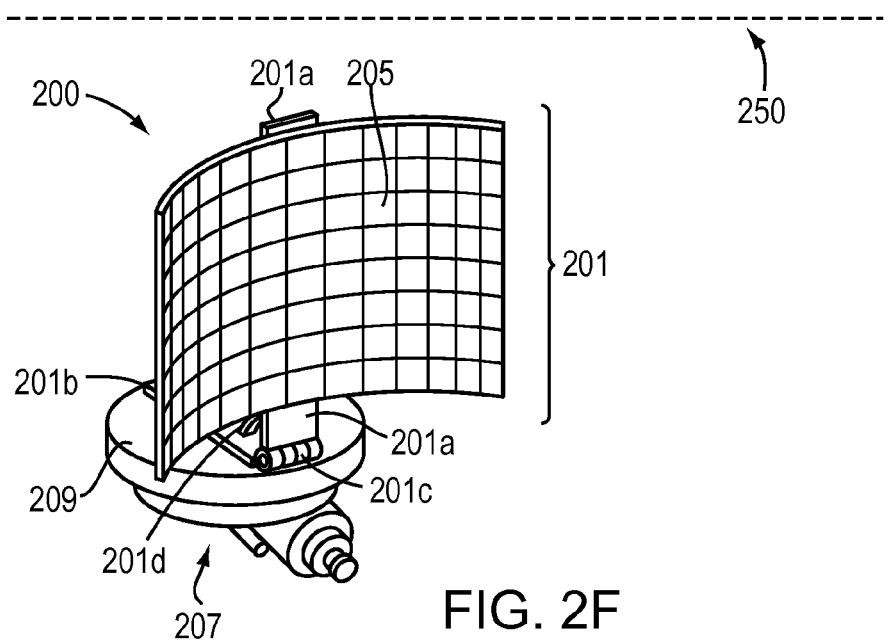

FIG. 2F illustrates a perspective view of a third example embodiment of a surveillance device 200 and mounting environment. The surveillance device 200 can include an imaging device 207, such as a camera, mounting module 201, solar module 205 including solar cells, and base structure 209. The mounting environment includes a ceiling 250, light fixture 254, and artificial light source 252. The light fixture 254 and light source 252 can be a conventional recessed light fixture and floodlight bulb, respectively.

The mounting module 201 can made up of multiple mounting components 201a-d, such as, upper mounting bracket arm 201a, lower mounting bracket arm 201b, mounting joint (or hinge) 201c, and mounting support component (or support spring) 201d. The solar module 205 including solar cells is coupled to upper mounting bracket arm 201a, which includes a mounting surface of the mounting module 201, and can use flexible solar cells to facilitate mounting at a circular recessed light fixture 254, while maximizing exposure to the artificial light source 252. A flexible permanent magnet can be used as a mounting element (not visible in FIG. 2F) and arranged on a side opposite that of the solar module 205.

As illustrated in FIG. 2F, the solar module 205 can be in a perpendicular arrangement with the imaging device 207 and the base structure 209, while also being in a parallel arrangement with the mounting element. By using a flexible solar module 205, flexible magnet mounting element, and mounting structure 201—including mounting elements 201a-d—it is possible to mount the solar powered surveillance device 200 on a recessed lighting fixture 254 in close proximity to an artificial light source 252.

Figure 2G:
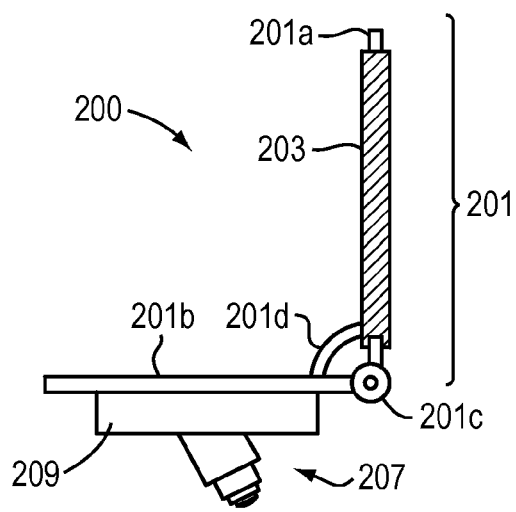

FIG. 2G shows a side view of the third example embodiment of the surveillance device 200. The surveillance device 200 of FIG. 2G includes a mounting element 203 (flexible permanent magnet), mounting module 201, imaging device 207 (video camera), and base structure 209. The surveillance device 200 of FIG. 2G can further include solar module 205

(not visible in FIG. 2G) arranged opposite of the mounting element 203. The mounting module 201 can made up of multiple mounting components 201a-d, such as, upper mounting bracket arm 201a, lower mounting bracket arm 201b, mounting joint (or hinge) 201c, and mounting support component (or support spring) 201d. The solar module 205 and mounting element 203 are in perpendicular arrangement with imaging device 207 and base structure 209. The mounting module 201 having perpendicularly arranged bracket arms 201a,b allows for such a configuration.

In view of the above example embodiments of surveillance device 200 of FIGS. 2A-2G, it should be understood by those of skill in the art that other embodiments are possible, such that the surveillance device can be mounted near and exposed to any style, or type or shaped artificial light source. For example, the mounting module may be configured to arrange the solar module and mounting surface with mounting elements perpendicular to each other or in any configuration as determined by the environment surrounding the artificial lighting source, the geometry and material of the light fixture, as well as the shape of the light source.

Further, those of skill in the art will recognize that mounting elements other than permanent magnets can be used. For example, suction cups, mechanical brackets, or hook-and-loop fasteners can all be used as mounting elements. For a mounting element embodiment of hook-and-loop fasteners, a "hook" fastener can be coupled (or adhered) to the mounting module while a mating "loop" fastener can be couple (or adhered) to a lighting fixture or support structure. The "hook" and "loop" fasteners can be mated to mount the surveillance device.

Figure 3:
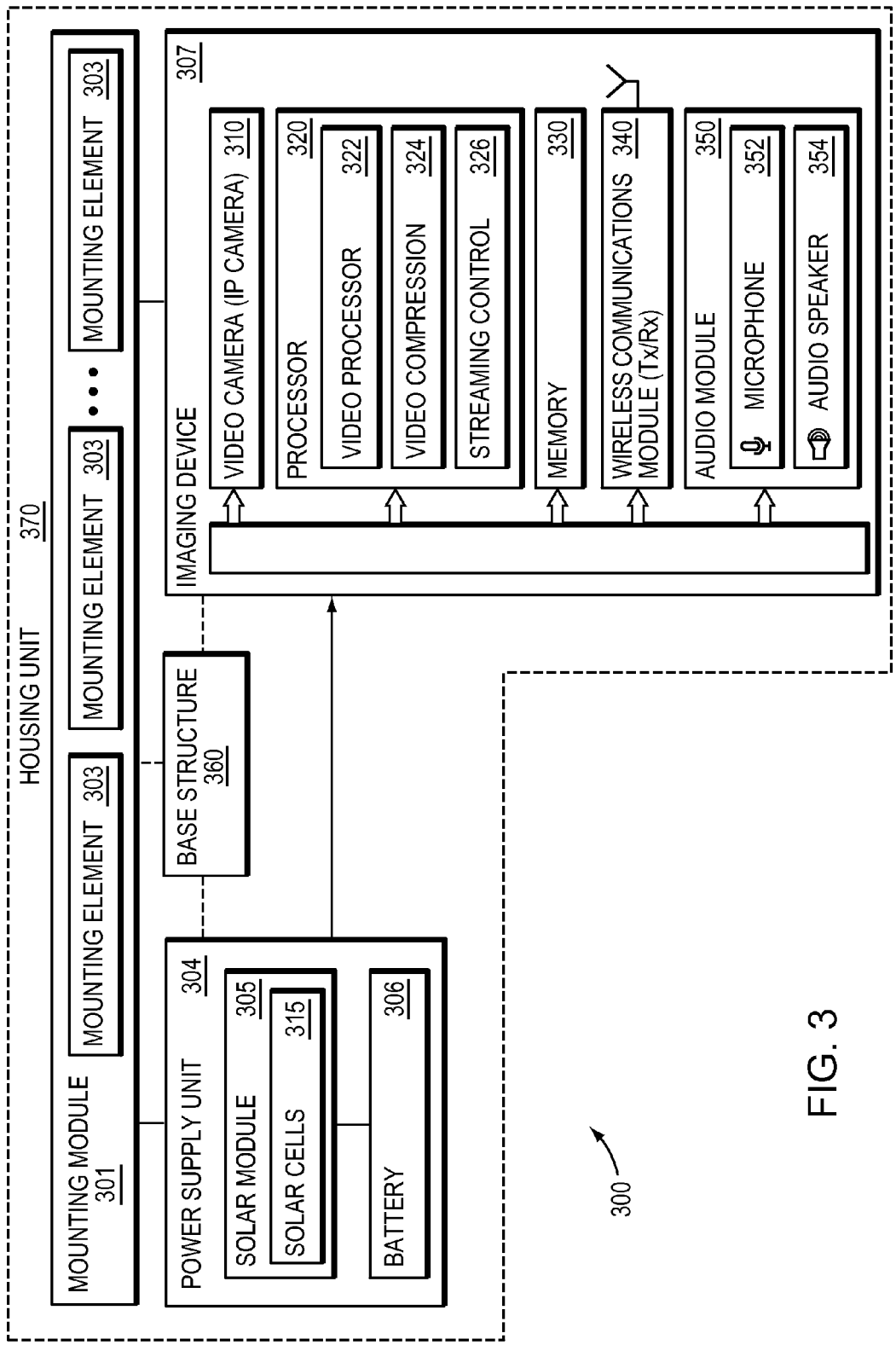
FIG. 3 is a high-level block diagram of an example embodiment of the surveillance device.

FIG. 3 is a high-level functional block diagram of an example embodiment of a surveillance device 300. The surveillance device 300 includes a mounting module 301, power supply unit 304, and imaging device 307. The mounting module 301 can be coupled to power supply unit 304 and imaging device 307 as indicated by the solid connection lines. A power supply unit 304 supplies power to an imaging device 307, as indicated by an arrow spanning therebetween. The mounting module 301 can include mounting elements 303, such as permanent magnets brackets and/or hook-and-loop fasteners or other similar mounting elements. Alternatively or in addition to the coupling between mounting module 301, power unit 304 and imaging device 307, the mounting module 301, power supply unit 304, and imaging device 307 may be coupled to a base structure 360, such that base structure 360 couples between, in addition to, or in lieu of, the coupling between the mounting module 301 and (i) power supply unit 304, and (ii) imaging device 307. The imaging device 307 and power supply unit 304 can be coupled to the base structure 360, which, in turn, can be coupled to the mounting module 301.

The power supply unit 304 includes a solar module 305 and, optionally, a battery 306. The solar module 305 can include solar cells 315, which may be arranged as an array of solar cells. The solar cells may be photovoltaic (PV) cells enabling light to be converted to electrical energy using the photovoltaic effect. The power supply unit 304 provides available power to the surveillance device 300, including the components thereof, such as the imaging device 307 and the subcomponents thereof, described below in more detail.

The imaging device 307 can include a camera 310, such as a video camera or Internet Protocol (IP) camera, processor 320, memory module 330 or other storage device, a communications module 340, and audio module 350. The video camera 310 may be a low-power video camera, IP camera, or another imaging device, such as a thermal imaging device or night vision device, etc.

A processor 320 can include a video processor module 322, video compression module 324, and streaming control module 326. The processor 320 can execute image processing for the imaging device 307 to produce a video or imaging feed to the wireless communications module for transmission. A bus can be used to operatively couple (power and communications) the elements of the imaging device 307. A memory module 330 or other storage device can be used for buffering for the image processing and/or to store command routines or other data.

The communications module 340 can be a wireless or wired communications module. When wired, the communications module 340 can support wired protocols such as Ethernet and/or twisted-pair. The communications module 340 can include a transceiver, enabling the surveillance device 300 to transmit output and receive input wirelessly. In one embodiment, the communications module 340 can enable output only (i.e., transmission only) and, in another embodiment, input/output (i.e., reception and transmission) functionalities. The wireless communications module 340 can use radio frequency (RF), optical, infrared (IR), or other wireless communications mediums known in the art or present or future equivalents thereof.

An audio module 350 can include a microphone 352 and an audio speaker 354. The audio module 350 can enable verbal communications with a target of surveillance.

A housing unit 370 can be used to house the surveillance device 300 and to integrate and/or couple to the mounting module 301, optional base structure 360, power supply unit 304 and imaging device 307. The housing unit 370 can provide additional structural integrity to the surveillance device 300.

Figure 4A:
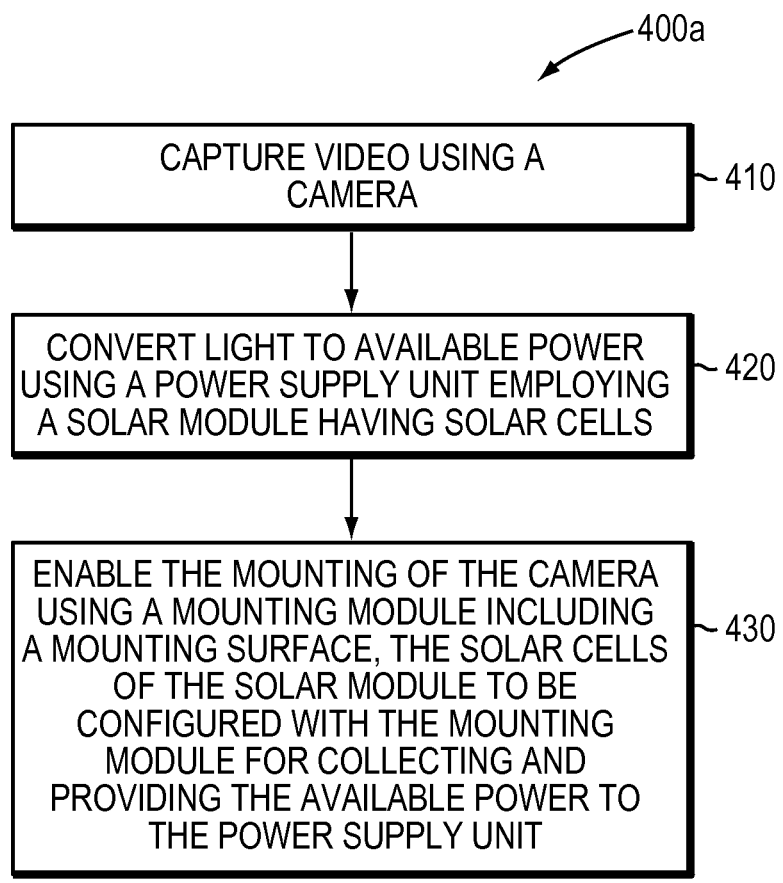
FIGS. 4A and 4B are flow diagrams of example methods of surveying according to embodiments of the present invention.
Figure 4B:
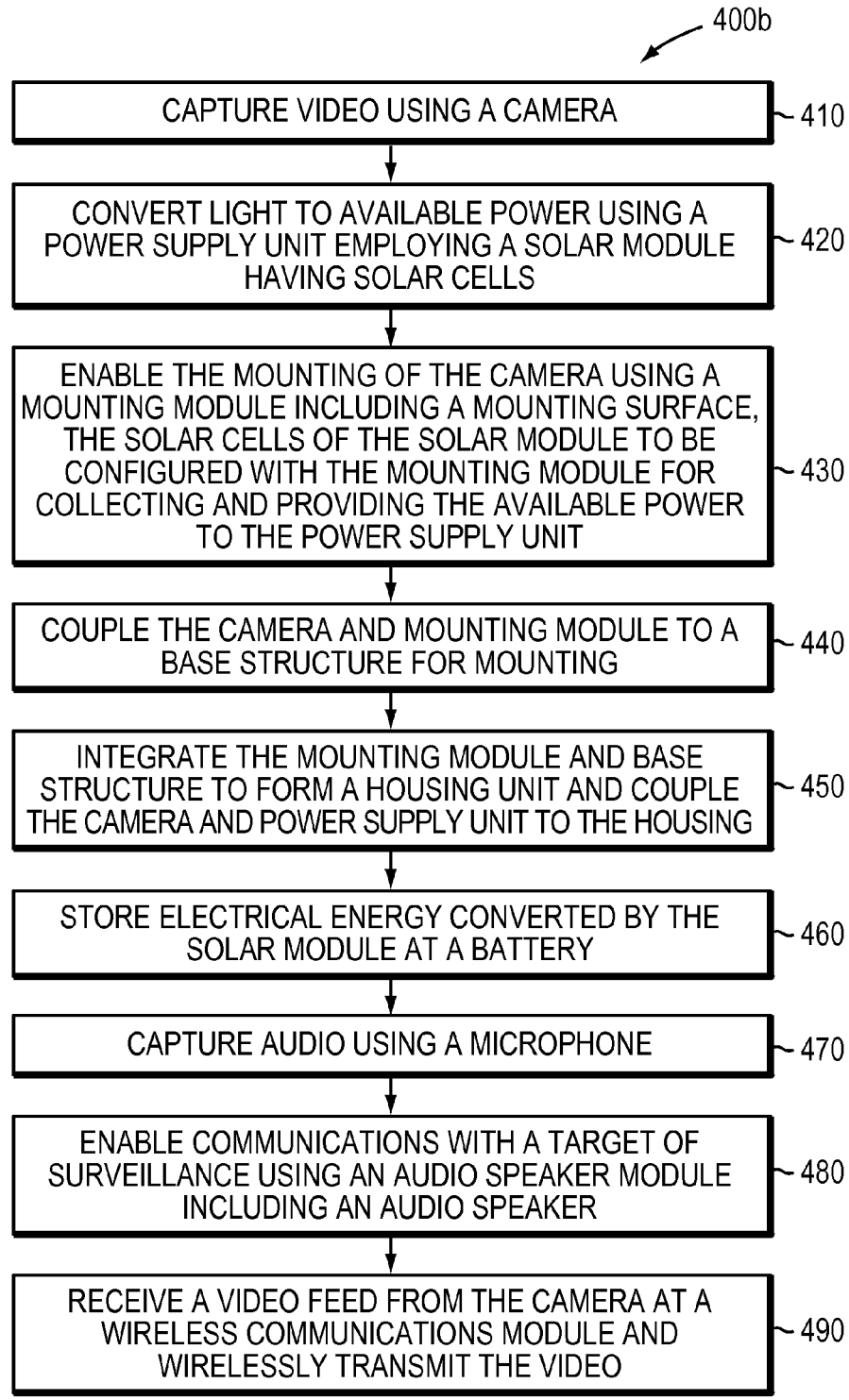

FIGS. 4A and 4B are flow diagrams illustrating example methods of the present invention.

In FIG. 4A, a method of performing surveillance the process of surveying 400a includes capturing video using a camera or other imaging device (410), converting light to available power using the power supply unit employing a solar module having solar cells (420), and enabling the mounting of the camera using a mounting module including a mounting surface, the solar cells of the solar module being configured with the mounting module for collecting and providing the available power to the power supply unit (430).

FIG. 4B illustrates an example of a method 400b, which includes operations 410-430 of method 400a, and further includes coupling the camera and mounting module to a base structure for mounting (440), integrating the mounting module and base structure to form a housing unit and coupling the camera and power supply unit to the housing (450), storing electrical energy converted by the solar module at a battery (460), capturing audio using a microphone (470), enabling communications with a target of surveillance using an audio speaker module including an audio speaker (480), and receiving a video feed from the camera at a wireless communications module and wirelessly transmitting the video (490). Those having skill in the art will recognize that the order of the operations presented in method 400a and 400b is only illustrative, and such operations can be executed in any sequence suitable for useful surveillance.

The example procedures of surveying 400a and 400b can further include arranging the solar cells of the solar module on the mounting surface for collecting the light and providing the available power to the power supply unit. The mounting can further include employing a mounting element, such as a magnetic material arranged on the mounting surface for mounting to a paramagnetic material in close proximity to a lighting source. The mounting to the paramagnetic material in close proximity to a lighting source can further include mounting to a metal channel support of a drop ceiling in close proximity to a drop ceiling lamp. The mounting can additionally, or alternatively, include employing mounting elements such as magnetic material, further including employing one or more permanent magnets or ferromagnetic materials. The employing one or more permanent magnets can include arranging the magnets along at least one edge of the mounting surface.

The example methods of performing surveillance 400*a* and 400*b* can further include converting light to available power and storing electrical energy converted by the solar module at a battery. The mounting can further include employing brackets coupled to the mounting surface to enable the mounting of the surveillance device to a metal channel of a drop ceiling in close proximity to a lighting source. The capturing of video can be accomplished using and Internet Protocol (IP) camera, and the IP camera can be directly or indirectly powered using the available power provided by the solar module. The mounting can further include employing a hook-and-loop fastener module coupled to the mounting surface and enabling the mounting of the surveillance device to a hook-and-loop fastener receptacle in close proximity to a lighting source.

While this invention has been particularly shown and described with references to example embodiments thereof, it will be understood by those skilled in the art that various changes in form and details may be made therein without departing from the scope of the invention encompassed by the appended claims.

What is claimed is:

1. A surveillance device, comprising:
   an imaging device;
   a power supply unit employing a solar module having solar cells to convert light from an artificial light source to available power; and
   a mounting module coupled to the imaging device, the mounting module including a mounting surface, the mounting surface having mounting features adapted to couple the surveillance device to a housing of the artificial light source, the housing being fixed to an object other than the surveillance device, the mounting features, when coupled, supporting the surveillance device on the housing and arranging the solar cells in a photonic reception orientation with respect to the artificial light source, the solar cells of the solar module being configured therewith to collect the light and provide the available power to the power supply unit.

2. The surveillance device of claim 1, wherein the solar cells of the solar module are arranged on the mounting surface to collect the light and provide the available power to the power supply unit.

3. The surveillance device of claim 1, further including a base structure having a bottom side, the imaging device being coupled to the bottom side, and the mounting module being coupled to the base structure and arranged to mount the surveillance device.

4. The surveillance device of claim 3, further including a housing unit integrating the base structure and the mounting module, and coupled to the imaging device and power supply unit.

5. The surveillance device of claim 1, wherein the mounting module further includes a magnetic material arranged on the mounting surface to enable the surveillance device to mount to a paramagnetic material in close proximity to the artificial light source.

6. The surveillance device of claim 5, wherein the paramagnetic material is a metal channel support of a drop ceiling and the artificial light source is a drop ceiling lamp.

7. The surveillance device of claim 5, wherein the magnetic material includes one or more permanent magnets.

8. The surveillance device of claim 7, wherein the one or more permanent magnets are arranged along at least one edge of the mounting surface.

9. The surveillance device of claim 1, wherein the power supply unit further includes a battery to store electrical energy based on the available power.

10. The surveillance device of claim 1, further including a microphone to enable audio surveillance, and being powered directly or indirectly by the available power.

11. The surveillance device of claim 10, further including an audio speaker module with an audio speaker to enable verbal communications with a target of surveillance, the audio speaker module being powered directly or indirectly by the available power.

12. The surveillance device of claim 1, wherein the mounting module further includes brackets coupled to the mounting surface to enable the surveillance device to couple to a support channel of a drop ceiling in close proximity to the artificial light source.

13. The surveillance device of claim 1, wherein the imaging device is an Internet Protocol (IP) camera being powered directly or indirectly by the available power.

14. The surveillance device of claim 1, further including a wireless communications module communicatively coupled to the imaging device to receive a video feed and configured to transmit the video feed wirelessly, the wireless communications module being powered directly or indirectly by the available power.

15. The surveillance device of claim 1, wherein the mounting module further includes a hook-and-loop fastener module coupled to the mounting surface to enable the surveillance device to mount to a hook-and-loop fastener receptacle in close proximity to the artificial light source.

16. A method of performing surveillance, comprising:
    capturing video using an imaging device;
    converting light from an artificial light source to available power using a power supply unit employing a solar module having solar cells; and
    enabling the mounting of the imaging device using a mounting module including a mounting surface, the mounting surface having mounting features adapted to couple the surveillance device to a housing of the artificial light source and support the surveillance device on the housing, the housing being fixed to an object other than the surveillance device, the solar cells of the solar module being configured therewith for collecting the light and providing the available power to the power supply unit.

17. The method of performing surveillance of claim 16, wherein enabling the mounting further includes arranging the solar cells of the solar module on the mounting surface for collecting the light and providing the available power to the power supply unit.

18. The method of performing surveillance of claim 16, further including coupling the imaging device and the mounting module to a base structure, the imaging device being coupled to a bottom side of the base structure, and the mounting module arranging the base structure for mounting.

19. The method of performing surveillance of claim 18, further including integrating the mounting module and the base structure to form a housing unit, and coupling the imaging device and power supply unit thereto.

20. The method of performing surveillance of claim 16, wherein the mounting further includes employing a magnetic material arranged on the mounting surface for mounting to a paramagnetic material in close proximity to the artificial light source.

21. The method of performing surveillance of claim 20, wherein the mounting to the paramagnetic material in close proximity to the artificial light source further includes mounting to a metal channel support of a drop ceiling in close proximity to a drop ceiling lamp.

22. The method of performing surveillance of claim 20, wherein the mounting employing the magnetic material further includes employing one or more permanent magnets.

23. The method of performing surveillance of claim 22, wherein the employing one or more permanent magnets further includes arranging the one or more permanent magnets along at least one edge of the mounting surface.

24. The method of performing surveillance of claim 16, wherein the converting light to available power further includes storing electrical energy converted by the solar module at a battery.

25. The method of performing surveillance of claim 16, further including capturing audio using a microphone, enabling audio surveillance, and directly or indirectly powering the microphone using the available power.

26. The method of performing surveillance of claim 25, further including communicating to a target of surveillance using an audio speaker module including an audio speaker, and directly or indirectly powering the audio speaker module using the available power.

27. The method of performing surveillance of claim 16, wherein the mounting further includes employing brackets coupled to the mounting surface to enable the mounting of the surveillance device to a support channel of a drop ceiling in close proximity to the artificial light source.

28. The method of performing surveillance of claim 16, wherein the capturing video uses an Internet Protocol (IP) camera and directly or indirectly powering the IP camera using the available power.

29. The method of performing surveillance of claim 16, further including receiving a video feed from the imaging device at a wireless communications module, wirelessly transmitting the video feed, and directly or indirectly powering the wireless communications module using the available power.

30. The method of performing surveillance of claim 16, wherein the mounting further includes employing a hook-and-loop fastener module coupled to the mounting surface enabling the mounting of the surveillance device to a hook-and-loop fastener receptacle in close proximity to the artificial light source.

31. A surveillance device, comprising:
means for capturing video;
means for converting light from an artificial light source to available power; and
means for mounting the surveillance device to a housing of the artificial light source and providing the available power for capturing video, the housing being fixed to an object other than the surveillance device, and the housing supporting the surveillance device.

* * * * *